United States Patent
Miyamoto et al.

(10) Patent No.: US 9,550,862 B2
(45) Date of Patent: *Jan. 24, 2017

(54) POLYIMIDE PRECURSOR COMPOSITION, METHOD FOR PREPARING POLYIMIDE PRECURSOR, POLYIMIDE MOLDED ARTICLE, AND METHOD FOR PREPARING POLYIMIDE MOLDED ARTICLE

(71) Applicant: FUJI XEROX CO., LTD., Tokyo (JP)

(72) Inventors: Tsuyoshi Miyamoto, Kanagawa (JP); Kana Miyazaki, Kanagawa (JP); Tomoya Sasaki, Kanagawa (JP); Katsumi Nukada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,772

(22) Filed: Jan. 29, 2015

(65) Prior Publication Data

US 2016/0024256 A1 Jan. 28, 2016

(30) Foreign Application Priority Data

Jul. 25, 2014 (JP) .................................. 2014-152056

(51) Int. Cl.
C08G 73/10 (2006.01)
(52) U.S. Cl.
CPC .................................. C08G 73/1071 (2013.01)
(58) Field of Classification Search
None
See application file for complete search history.

(56) References Cited

U.S. PATENT DOCUMENTS

| | | | |
|---|---|---|---|
| 3,507,765 A | 4/1970 | Holub | |
| 3,663,728 A | 5/1972 | Hoback et al. | |
| 4,238,528 A | 12/1980 | Angelo et al. | |
| 4,518,673 A | 5/1985 | Noguchi et al. | |
| 4,535,105 A | 8/1985 | Inaike et al. | |
| 4,960,846 A | 10/1990 | Burgess et al. | |
| 4,994,544 A | 2/1991 | Nagahiro et al. | |
| 5,180,650 A | 1/1993 | Sacripante et al. | |
| 5,202,412 A | 4/1993 | Auman et al. | |
| 5,510,395 A | 4/1996 | Tomioka et al. | |
| 5,719,253 A | 2/1998 | Echigo et al. | |
| 2008/0200560 A1 | 8/2008 | Kniess et al. | |
| 2011/0318683 A1 | 12/2011 | Kadokura et al. | |
| 2011/0319767 A1 | 12/2011 | Tsuruno | |
| 2014/0213723 A1* | 7/2014 | Miyamoto | C08K 5/1575 524/754 |
| 2014/0218875 A1 | 8/2014 | Nakayama et al. | |

FOREIGN PATENT DOCUMENTS

| | | |
|---|---|---|
| JP | S59-164328 | 9/1984 |
| JP | H05281779 A | 10/1993 |
| JP | H06-293834 A | 10/1994 |
| JP | H08-15519 | 1/1996 |
| JP | H08-59832 A | 3/1996 |
| JP | H08-120777 A | 5/1996 |
| JP | H08-157599 A | 6/1996 |
| JP | H10-195295 A | 7/1998 |
| JP | 2003-012964 A | 1/2003 |
| JP | 2003-013351 A | 1/2003 |
| JP | 4540673 B2 | 9/2010 |
| JP | 2011-140589 A | 7/2011 |
| JP | 2012-005689 A | 1/2012 |
| JP | 2012-036382 A | 2/2012 |
| JP | 2012-140582 A | 7/2012 |
| JP | 2013-067769 A | 4/2013 |
| JP | 2013-144750 A | 7/2013 |
| JP | 2013-144751 A | 7/2013 |
| JP | 2013-144752 A | 7/2013 |

OTHER PUBLICATIONS

Sroog et al., "Polyimides," Journal of Polymer Science, Macromolecular Reviews, vol. 11, pp. 161 & 164, 1976.
Oct. 8, 2015 Office Action issued in U.S. Appl. No. 14/607,727.
Mar. 26, 2015 Office Action issued in U.S. Appl. No. 14/043,319.
Nov. 20, 2014 Office Action issued in U.S. Appl. No. 14/043,319.
Aug. 11, 2015 Office Action issued in U.S. Appl. No. 14/043,319.
U.S. Appl. No. 14/038,230, filed Sep. 26, 2013 in the name of Miyamoto.
U.S. Appl. No. 14/607,727, filed Jan. 28, 2015 in the name of Miyamoto et al.
Jun. 5, 2015 Office Action issued in U.S. Appl. No. 14/038,230.
Oct. 15, 2015 Office Action issued in U.S. Appl. No. 14/038,230.
Feb. 10, 2015 Office Action issued in Japanese Patent Application No. 2013-017934.
Sep. 30, 2014 Office Action issued in Japanese Patent Application No. 2013-017934.
Mar. 7, 2016 Office Action issued in U.S. Appl. No. 14/607,727.
Mar. 14, 2016 Office Action issued in U.S. Appl. No. 14/038,230.
Yang et al., "A Water-Soluble Polyimide Precursor: Synthesis and Characterization of Poly(amic acid) Salt," Macromolecular Research, 2004, vol. 12, No. 3, pp. 263-268.
Oct. 24, 2016 Office Action issued in U.S Appl. No. 14/038,230.

* cited by examiner

*Primary Examiner* — Ana Woodward
(74) *Attorney, Agent, or Firm* — Oliff PLC

(57) ABSTRACT

A polyimide precursor composition includes a polyimide precursor including a condensation polymer of a tetracarboxylic dianhydride composed of a first tetracarboxylic dianhydride having a benzene ring to which two carboxylic anhydride groups are bonded and a second tetracarboxylic dianhydride other than the first tetracarboxylic dianhydride, and a diamine compound; a tertiary amine compound; and a water-soluble solvent containing at least one kind selected from the group consisting of water and aqueous alcohol, wherein the polyimide precursor and the tertiary amine compound are dissolved in the water-soluble solvent.

14 Claims, No Drawings

POLYIMIDE PRECURSOR COMPOSITION, METHOD FOR PREPARING POLYIMIDE PRECURSOR, POLYIMIDE MOLDED ARTICLE, AND METHOD FOR PREPARING POLYIMIDE MOLDED ARTICLE

CROSS-REFERENCE TO RELATED APPLICATIONS

This application is based on and claims priority under 35 USC 119 from Japanese Patent Application No. 2014-152056 filed Jul. 25, 2014.

BACKGROUND

1. Technical Field

The present invention relates to a polyimide precursor composition, a method for preparing a polyimide precursor, a polyimide molded article, and a method for preparing a polyimide molded article.

2. Related Art

A polyimide resin is a material having characteristics of high durability and excellent heat resistance, and is widely used in electronic material applications.

SUMMARY

According to an aspect of the invention, there is provided a polyimide precursor composition, including:

a polyimide precursor including a condensation polymer of a tetracarboxylic dianhydride composed of a first tetracarboxylic dianhydride having a benzene ring to which two carboxylic anhydride groups are bonded and a second tetracarboxylic dianhydride other than the first tetracarboxylic dianhydride, and a diamine compound;

a tertiary amine compound; and a water-soluble solvent containing at least one kind selected from the group consisting of water and aqueous alcohol, wherein the polyimide precursor and the tertiary amine compound are dissolved in the water-soluble solvent.

DETAILED DESCRIPTION

Hereinafter, the exemplary embodiments of the invention will be described in detail.

Polyimide Precursor Composition

The polyimide precursor composition according to the present exemplary embodiment is a composition in which a polyimide precursor including a condensation polymer of a tetracarboxylic dianhydride containing a first tetracarboxylic dianhydride having a benzene ring to which two carboxylic anhydride groups are bonded and a second tetracarboxylic dianhydride other than the first tetracarboxylic dianhydride, and a diamine compound (hereinafter referred to as a "specific polyimide precursor") and a tertiary amine compound are dissolved in an aqueous solvent. That is, the specific polyimide precursor and the tertiary amine compound are included in the composition in the state of being dissolved in an aqueous solvent. Further, the dissolution represents a state where the remaining materials dissolved may not be visually observed.

Further, as the aqueous solvent, an aqueous solvent containing at least one kind selected from the group consisting of water and a water-soluble alcohol solvent is used.

The polyimide precursor composition according to the present exemplary embodiment has excellent film forming properties. The reason for this is not clear, but it is presumably due to the following reason.

First, the first tetracarboxylic dianhydride typically such as pyromellitic dianhydride is characterized by 1) having low cost, 2) having a low molecular weight, contributing to having a small proportion of polyimide precursors, and 3) having a highly stable molecular structure, thereby forming a rigid benzene ring-imide ring, as compared with other tetracarboxylic dianhydrides. Therefore, a composition including a polyimide imide precursor using the first tetracarboxylic dianhydride has high mechanical strength and accomplishes molding of a polyimide molded article at low cost.

However, the first tetracarboxylic dianhydride has a highly stable molecular structure and forms a rigid benzene ring-imide ring, and therefore, in the case of using the first tetracarboxylic dianhydride alone a tetracarboxylic dianhydride, the resulting polyimide precursor is also rigid and has a high molecular symmetry, and thus easily aggregates in an aqueous solvent such as water and a water-soluble alcohol solvent. For this reason, the film forming properties of the composition may be reduced in some cases. Further, in an aqueous solvent such as water or water-soluble alcohol solvent, a composition is unlikely to be dissolved and the film forming properties thereof are decreased in some cases.

Meanwhile, when the first tetracarboxylic dianhydride is used in combination with a second tetracarboxylic dianhydride other than the first tetracarboxylic dianhydride, the molecular symmetry of the resulting polyimide precursor is reduced. For this reason, occurrence of aggregation of the polyimide precursor in the aqueous solvent is prevented.

In addition, as the aqueous solvent, when an aqueous solution containing at least one kind selected from the group consisting of water and a water-soluble alcohol solvent is used and a tertiary amine compound is dissolved in the aqueous solution, a specific polyimide precursor (carboxyl group thereof) becomes a state of amine-chloridation due to the tertiary amine compound. Therefore, the solubility of the polyimide precursor formed due to the combination is increased (solubility with respect to the aqueous solution).

From the description above, the polyimide precursor composition according to the present exemplary embodiment has excellent film forming properties. Further, a polyimide molded article obtained by molding this polyimide precursor composition has excellent surface properties.

Here, since the first tetracarboxylic dianhydride typically such as pyromellitic dianhydride has a structure having two carboxylic anhydride groups bonded to one benzene ring, a hydrolysis reaction of a carboxylic anhydride group (carboxylic anhydride structure) easily occurs in water. Particularly, a hydrolysis reaction is promoted in the coexistence of the primary amine compound or the secondary amine compound. Particularly, an acid anhydride group is ring-opened and an amidation reaction is caused under the present of the primary amine compound. As a result, it is difficult to obtain a polymer capable of expressing sufficient strength. Meanwhile, in a water-soluble alcohol solvent, a carboxylic anhydride group (anhydride carboxylic acid structure) easily causes a ring-opening esterification reaction. For this reason, a polycondensation reaction with a diamine compound hardly proceeds, and it is thus hard to impart a high molecular weight in some cases.

Meanwhile, there is a tendency that the hydrolysis reaction and the ring-opening esterification reaction of the first tetracarboxylic dianhydride are inhibited by combining the first tetracarboxylic dianhydride with the second tetracarboxylic anhydride other than the first tetracarboxylic dianhydride. Accordingly, the polycondensation reaction easily proceeds, and imparting a high molecular weight to the polyimide precursor to be formed is easily promoted.

Further, as an amine compound functioning as an amine-chloridation accelerator and an imidization accelerator, not a primary or secondary amine compound but a tertiary amine compound is applied. For this reason, the progress of the hydrolysis reaction or the ring-opening esterification reaction is suppressed, and thus, the polycondensation reaction easily occurs. Accordingly, inhibiting the polyimide precursor from being imparted with a high molecular weight due to the progress of the hydrolysis reaction or the ring-opening esterification reaction is easily suppressed.

Accordingly, the polyimide precursor composition according to the present exemplary embodiment makes it easier to obtain a polyimide molded article having an excellent mechanical strength. Further, contraction due to heating during the molding is easily suppressed.

In the polyimide precursor composition according to the present exemplary embodiment, an aqueous solvent is applied as a solvent, and therefore, the polyimide precursor composition according to the present exemplary embodiment has an excellent environmental suitability. Further, when a polyimide molded article is molded using the polyimide precursor composition according to the present exemplary embodiment, lowering of the heating temperature for evaporation of a solvent and shortening of the heating time is accomplished.

In the polyimide precursor composition according to the present exemplary embodiment, an aqueous solvent is applied as a solvent, and therefore, an aprotic polar solvent is not included as the solvent or the amount thereof is reduced.

Further, an aprotic polar solvent is a solvent having a boiling point of 150° C. to 300° C. and a dipole moment of 3.0 D to 5.0 D. Specific examples of an aprotic polar solvent include N-methyl-2-pyrrolidone (NMP), N,N-dimethylformamide (DMF), N,N-dimethylacetamide (DMAc), dimethylsulfoxide (DMSO), hexanemethylenephosphoramide (HMPA), N-methylcaprolactam, and N-acetyl-2-pyrrolidone.

An aprotic polar solvent typically such as N-methyl-2-pyrrolidone (NMP) has a high boiling point which is 150° C. or higher, and the solvent in the composition remains in a molded article in many cases even after a drying process in the preparation of a polyimide molded article. If the aprotic polar solvent remains in the polyimide molded article, reorientation of a polymer chain of the polyimide precursor occurs and packing properties of the polymer chain deteriorate. Therefore, the mechanical strength of the obtained polyimide molded article decreases in some cases.

Meanwhile, an aprotic polar solvent is not included in the solvent or a smaller amount of an aprotic polar solvent is included in the solvent, and therefore, the obtained polyimide molded article does not include an aprotic polar solvent or a smaller amount of an aprotic polar solvent. As a result, a decrease in the mechanical strength of the polyimide molded article formed of the polyimide precursor composition according to the exemplary embodiment is prevented.

Incidentally, when an aprotic polar solvent is not included in the solvent or a smaller amount of an aprotic polar solvent is included, a polyimide resin molded article having excellent characteristics such as heat resistance, electrical characteristics, and solvent resistance is easily obtained.

In the polyimide precursor composition according to the present exemplary embodiment, the specific polyimide precursor as a polyimide precursor is not a low-molecular weight compound, does not have a structure in which the solubility thereof in a solvent is increased by introducing a flexural chain, an aliphatic cyclic structure, or the like into the primary structure to reduce the force of interaction between polymer chains, and is dissolved in the solvent in a state of amine-chloridation due to the tertiary amine compound by using the aqueous solvent having the specific composition as a solvent. For this reason, a decrease in the mechanical strength of the polyimide molded article that is caused by the method in the related art for improving solubility of a polyimide precursor resin when the molecular weight of the polyimide precursor is decreased or the molecular structure is changed does not occur, and further, it is possible to promote the dissolution of the polyimide precursor in water.

Moreover, in a case where an aromatic polyimide precursor (for example, a condensation polymer of an aromatic tetracarboxylic dianhydride with an aromatic diamine compound) is applied as the specific polyimide precursor in the polyimide precursor composition according to the present exemplary embodiment, the polyimide precursor tends to hardly dissolve in a solvent, but dissolves in an aqueous solvent as a solvent in a state in which the specific polyimide precursor is chloridized due to the tertiary amine compound. For this reason, even in a case where an aromatic polyimide precursor is applied as the specific polyimide precursor, the film forming properties are high and the environmental suitability is excellent.

Hereinafter, the respective components of the polyimide precursor composition according to the present exemplary embodiment will be described.

Specific Polyimide Precursor

The specific polyimide precursor is a resin (polyamic acid) including a condensation polymer of a tetracarboxylic dianhydride containing a first tetracarboxylic dianhydride and a second tetracarboxylic dianhydride with a diamine compound. Further, the imidization rate of the specific polyimide precursor is preferably 0.2 or less.

The first tetracarboxylic dianhydride will be described.

The first tetracarboxylic dianhydride is a tetracarboxylic dianhydride having a benzene ring to which two carboxylic anhydride groups are bonded. That is, the first tetracarboxylic dianhydride is a tetracarboxylic dianhydride having a structure having at least one benzene ring, in which two carboxylic anhydride groups are bonded to the one benzene ring.

The first tetracarboxylic dianhydride is not particularly limited as long as it has a structure having a benzene ring to which two carboxylic anhydride groups are bonded, but examples thereof include at least one selected from the group consisting of tetracarboxylic dianhydrides represented by the following formulae (TD11) and (TD12).

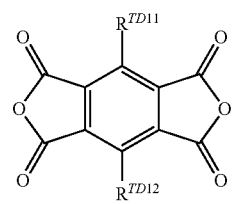

(TD11)

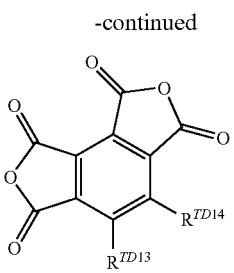

(TD12)

In the formulae (TD11) and (TD12), $R^{TD11}$, $R^{TD12}$, $R^{TD13}$, and $R^{TD14}$ each independently represent a hydrogen atom, a carboxyl group, a substituted or unsubstituted alkyl group, or a substituted or unsubstituted phenyl group.

In the formulae (TD11) and (TD12), examples of the alkyl group represented by $R^{TD11}$ to $R^{TD14}$ include ones having 1 to 12 (preferably 1 to 6) carbon atoms. The alkyl group may be chained or cyclic; in a case where the alkyl group is chained, it may be linear or branched; and in a case where the alkyl group is cyclic, it may be monocyclic or polycyclic (for example, bicyclic, tricyclic, and a spiro ring). Examples of the alkyl group include a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a neopentyl group, a tert-pentyl group, a cyclopentyl group, an n-hexyl group, an isohexyl group, a sec-hexyl group, a tert-hexyl group, a cyclohexyl group, an n-heptyl group, an isoheptyl group, a sec-heptyl group, a tert-heptyl group, a cycloheptyl group, an n-octyl group, an isooctyl group, a sec-octyl group, a tert-octyl group, a cyclooctyl group, an n-nonyl group, an isononyl group, a sec-nonyl group, a tert-nonyl group, a cyclononyl group, an n-decyl group, an isodecyl group, a sec-decyl group, a tert-decyl group, and a cyclodecyl group. Examples of the substituent which is substituted on the alkyl group include a hydroxyl group, a carboxyl group, and a cyano group.

In the formulae (TD11) and (TD12), examples of the substituent which is substituted on a phenyl group represented by $R^{TD11}$ to $R^{TD14}$ include a hydroxyl group, a carboxyl group, and a cyano group.

Suitable examples of the tetracarboxylic dianhydride represented by the formula (TD11) include tetracarboxylic dianhydrides, in which $R^{TD11}$ represents a hydrogen atom, a methyl group, a phenyl group, or a carboxyl group, and $R^{TD12}$ represents a hydrogen atom, a methyl group, a phenyl group, or a carboxyl group.

Suitable examples of the tetracarboxylic dianhydride represented by the formula (TD12) include tetracarboxylic dianhydrides, in which $R^{TD13}$ represents a hydrogen atom, a methyl group, a phenyl group, or a carboxyl group, and $R^{TD14}$ represents a hydrogen atom, a methyl group, a phenyl group, or a carboxyl group.

Specific examples of the first tetracarboxylic dianhydride include pyromellitic dianhydride, methylpyromellitic dianhydride, dimethylpyromellitic dianhydride, ethylpyromellitic dianhydride, diethylpyromellitic dianhydride, phenylpyromellitic dianhydride, diphenylpyromellitic dianhydride, 1,2,3,4,5-benzenepentacarboxylic 1,2,4,5-dianhydride, 1,2,3,4,5-benzenepentacarboxylic 1,2,3,4-dianhydride, benzenehexacarboxylic 1,2,4,5-dianhydride, and benzenehexacarboxylic 1,2,3,4-dianhydride.

The first tetracarboxylic dianhydride is preferably included in the proportion of from 40% by mole to 95% by mole, preferably from 45% by mole to 90% by mole, and more preferably from 50% by mole to 80% by mole, based on all the tetracarboxylic anhydrides, from the viewpoints of improvement of film forming properties and the mechanical strength of a molded article.

Furthermore, the first tetracarboxylic dianhydrides may be used alone or in combination of two or more kinds thereof.

The second tetracarboxylic dianhydride will be described.

The second tetracarboxylic dianhydride is a tetracarboxylic dianhydride other than the first tetracarboxylic dianhydride. That is, the second tetracarboxylic dianhydride is a second tetracarboxylic dianhydride having no benzene ring to which two carboxylic anhydride groups are bonded.

The second tetracarboxylic dianhydride may be any one of an aromatic tetracarboxylic dianhydride and an aliphatic tetracarboxylic dianhydride, but from the viewpoint of the improvement of the mechanical strength of a molded article, an aromatic tetracarboxylic dianhydride is preferable.

The second tetracarboxylic dianhydride is preferably, for example, a tetracarboxylic dianhydride having two benzene rings to which one carboxylic anhydride group is bonded. That is, the second tetracarboxylic dianhydride is preferably a tetracarboxylic dianhydride having at least two benzene rings, in which one carboxylic anhydride group is bonded to one benzene ring of the two benzene rings and one carboxylic anhydride group is bonded to the other benzene ring.

The second tetracarboxylic dianhydride is not particularly limited as long as it has a structure having no benzene ring to which two carboxylic anhydride groups are bonded, and examples thereof include at least one selected from the group consisting of tetracarboxylic dianhydrides represented by the following formulae (TD21) and (TD22).

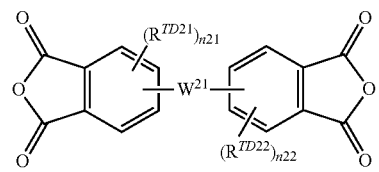

(TD21)

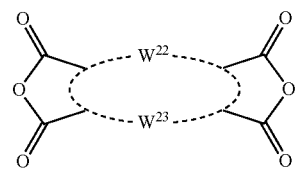

(TD22)

In the formula (TD21), $R^{TD21}$ and $R^{TD22}$ each independently represent a substituted or unsubstituted alkyl group or a substituted or unsubstituted phenyl group. Here, the details of the substituted or unsubstituted alkyl group or the substituted or unsubstituted phenyl group represented by $R^{TD21}$ and $R^{TD22}$ are the same as the substituted or unsubstituted alkyl group or the substituted or unsubstituted phenyl group represented by $R^{TD11}$ to $R^{TD14}$ in the formulae (TD11) and (TD12).

n21 and n22 each independently represent 0, or an integer of 1 to 3.

$W^{21}$ represents a single bond, or any one group of the following 1) to 8):

1) —C(=O)—, —C(=O)—O—, —C(=O)—NH—, or —O—;

2) an alkylene group (for example, an alkylene group having 1 to 12 carbon atoms);

3) a fluoroalkylene group (for example, an alkylene group having 1 to 12 carbon atoms, having at least one hydrogen atom substituted with a fluorine atom);

4) —Si(—$R^{TD23}$)(—$R^{TD24}$)— (in which $R^{TD23}$ and $R^{TD24}$ each independently represent an alkyl group (for example, an alkyl group having 1 to 3 carbon atoms), an aryl group (for example, a phenyl group and a naphthyl group), or an alkoxy group);

5) —O-Ph-$R^{TD25}$-Ph-O— (in which Ph represents a phenylene group, and $R^{TD25}$ represents —S—S—, —S(=O)$_2$—, an ester group, or an amide group);

6) —P(=O) (—$R^{TD26}$) (in which $R^{TD26}$ represents an aryl group (for example, a phenyl group), an ester group, or an amide group);

7) —C(-Ph$^A$)(-Ph$^A$)-Ph-$R^{TD27}$-Ph-C(-Ph$^A$)(-Ph$^A$) (in which Ph represents a phenylene group, Ph$^A$ represents a phenyl group, and $R^{TD27}$,s each independently represent —O—, an alkyl group (for example, an alkyl group having 1 to 6 carbon atoms), or an aryl group (for example, a phenyl group and a naphthyl group)); and 8) —O— ($R^{TD28}$)—O— (in which $R^{TD28}$ represents an alkylene group (for example, an alkylene group having 1 to 12 carbon atoms)).

In the formula (TD22), $W^{22}$ and $W^{23}$ represent atomic groups which are bonded to each other to form a substituted or unsubstituted condensed aromatic ring (for example, a naphthalene ring, a pyrene ring, and an anthracene ring), or a substituted or unsubstituted heterocycle (for example, a furan ring, a pyridine ring, and an imidazole ring).

Examples of the substituent which substitutes a condensed aromatic ring or a heterocycle include an alkyl group and a carboxyl group.

Suitable examples of the tetracarboxylic dianhydride represented by the formula (TD21) include tetracarboxylic dianhydrides, in which n21 and n22 represent 0 and $W^{21}$ represents —C(=O)— or an alkylene group (for example, an alkylene group having 1 to 6 carbon atoms).

Suitable examples of the tetracarboxylic dianhydride represented by the formula (TD22) include tetracarboxylic dianhydrides, in which $W^{22}$ and $W^{23}$ represent atomic groups which are bonded to each other to form a naphthalene ring, a furan ring, a pyrene ring, and an anthracene ring.

Examples of the aromatic tetracarboxylic acid for the second tetracarboxylic dianhydrides include 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,1'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3,4,4'-perfluoroisopropylidene diphthalic dianhydride, 3,3',4,4'-biphenyitetracarboxylic dianhydride, 2,3,3',4'-biphenyltetracarboxylic dianhydride, bis(phthalic acid) phenylphosphine oxide dianhydride, p-phenylene-bis (triphenylphthalic) dianhydride, m-phenylene-bis (triphenylphthalic) dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride for the second tetracarboxylic dianhydrides include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic acid, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofuran))-3-methyl-3-cyclohexene-1,2-dicarboxylic dianhydride, and bicyclo[2,2,2]-oct-7-ene-2,3,5,6-tetracarboxylic dianhydride; and aliphatic tetracarboxylic dianhydrides having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5, 9b-hexahydro-8-methyl-5-(tetrahydro-2,5-dioxo-3-furanyl)-naphtho[1,2-c]furan-1,3-dione.

The second tetracarboxylic dianhydride is preferably included in the proportion of from 5% by mole to 60% by mole (preferably from 10% by mole to 55% by mole, and more preferably from 20% by mole to 50% by mole), based on all the tetracarboxylic anhydrides, from the viewpoints of improvement of film forming properties and the mechanical strength of a molded article.

Moreover, the second tetracarboxylic dianhydrides may be used alone or in combination of two or more kinds thereof. Further, in a case where two or more kinds thereof are used in combination, combinations of the aromatic tetracarboxylic acids or the aliphatic tetracarboxylic acids, respectively, may be used, or a combination of the aromatic tetracarboxylic acids and the aliphatic tetracarboxylic acids may also be used.

The diamine compound will be described.

The diamine compound is a diamine compound having two amino groups in the molecular structure. Examples of the diamine compound include any aromatic diamine compound or aliphatic diamine compound, with an aromatic diamine compound being preferable.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenylsulfide, 4,4-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino 2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy) benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and hetero atoms other than nitrogen atoms of the amino groups such as diaminotetraphenyl thiophene; and aliphatic and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7- methanoindanylene dimethylenediamine, tricyclo[6,2,1,0$^{2,7}$]-undecylene dimethyldiamine, and 4,4'-methylenebis(cyclohexylamine).

Among these, an aromatic diamine compound is preferable as the diamine compound. Specifically, for example, p-phenylenediamine, m-pheylenediamine, 4,4'-diaminodiphenylmethane, 4,4'-diaminodiphenyl ether, 3,4'-diaminodiphenyl ether, 4,4'-diaminodiphenylsulfide, and 4,4'-diaminodiphenylsulfone are preferable, and 4,4'-diaminodiphenyl ether and p-phenylenediamine are particularly preferable.

Furthermore, the diamine compound may be used alone or in combination of two or more kinds thereof. Further, in a case where two or more kinds thereof are used in combination, combinations of the aromatic tetracarboxylic acids or the aliphatic tetracarboxylic acids, respectively, may be used, or a combination of the aromatic tetracarboxylic acids and the aliphatic tetracarboxylic acids may also be used.

Imidization Rate of Polyimide Precursor

The specific polyimide precursor is preferably a resin having an imidization rate of 0.2 or less (preferably 0.15, and more preferably 0.10). That is, the specific polyimide precursor may be a partially imidized resin.

When the imidization rate is 0.2 or less, the gelation or separation by precipitation of the polyimide precursor composition is suppressed, and thus, the deterioration of the storage stability and the film forming properties is easily suppressed.

The imidization rate of the specific polyimide precursor is measured by the following method.

Measurement of Imidization Rate of Polyimide Precursor

Preparation of Polyimide Precursor Sample (i) The polyimide precursor composition to be measured is coated onto a silicon wafer in a film thickness in a range of 1 μm to 10 μm to prepare a coating film sample.

(ii) The coating film sample is dipped in tetrahydrofuran (THF) for 20 minutes to replace the solvent in the coating film sample with tetrahydrofuran (THF). The solvent for dipping is not limited to THF and may be selected from solvents that do not dissolve the polyimide precursor and may be miscible in a solvent component contained in the polyimide precursor composition. Specifically, alcohol solvents such as methanol and ethanol and ether compounds such as dioxane may be used.

(iii) The coating film sample is taken out of the THF, and N$_2$ gas is blown to THF on the surface of the coating film sample to remove THE. The coating film sample is dried by treating the coating film sample for 12 hours or longer in the range of 5° C. to 25° C. under a pressure reduced to 10 mmHg or less, thereby preparing a polyimide precursor sample.

Preparation of 100% Imidized Standard Sample (iv) The polyimide precursor composition to be measured is coated onto a silicon wafer in the same manner as in the section (i) above to prepare a coating film sample.

(v) The coating film sample is heated for 60 minutes at 380° C. to perform an imidization reaction, thereby preparing a 100% imidized standard sample.

Measurement and Analysis (Measurement Examples and Analysis Examples of Polyimide Precursor Samples including 4,4'-Diaminodiphenyl Ether and 3,3',4,4'-Biphenyltetracarboxylic Dianhydride)

(vi) By using a Fourier transform infrared spectrophotometer (FT-730 manufactured by HORIBA, Ltd.), the infrared absorption spectra of the 100% imidized standard sample and the polyimide precursor sample are measured. The 100% imidized standard sample is measured to obtain a ratio I' (100) of an absorption peak (Ab' (1780 cm$^{-1}$)) derived from an imide bond around 1780 cm$^{-1}$ to an absorption peak (Ab' (1500 cm$^{-1}$)) derived from an aromatic ring around 1500 cm$^{-1}$.

(vii) Likewise, the polyimide precursor sample is measured to determine a ratio I (x) of an absorption peak (Ab (1780 cm$^{-1}$)) derived from an imide bond around 1780 cm$^{-1}$ to an absorption peak (Ab (1500 cm$^{-1}$)) derived from an aromatic ring around 1500 cm$^{-1}$.

In addition, by using the respective absorption peaks I' (100) and I (x) measured, an imidization rate of the polyimide precursor is calculated based on the following formula.

imidization rate of polyimide precursor=$I(x)/I'(100)$   Formula $I'(100)=(Ab'(1780\ cm^{-1}))/(Ab'(1500\ cm^{-1}))$   Formula $I(x)=(Ab(1780\ cm^{-1}))/(Ab(1500\ cm^{-1}))$   Formula Moreover, this measurement of an imidization rate of the polyimide precursor is applied to the measurement of an imidization rate of an aromatic polyimide precursor. For measuring the imidization rate of an aliphatic polyimide precursor, instead of the absorption peak of an aromatic ring, a peak derived from a structure that does not change before and after the imidization reaction is used as an internal standard peak.

Ratio of Tetracarboxylic Dianhydride to Diamine Compound

In the specific polyimide precursor, the molar equivalent number of the diamine compound is preferably higher than the molar equivalent number of the tetracarboxylic dianhydride.

This relationship is accomplished by adjusting the molar equivalent of the diamine compound used in the polymerization reaction to be in excess of the molar equivalent of the tetracarboxylic dianhydride. Regarding the ratio of the molar equivalent of the tetracarboxylic dianhydride to the diamine compound, the molar equivalent of the tetracarboxylic dianhydride based on 1 for the molar equivalent of the diamine compound is preferably in the range of 0.900 to 0.999, and more preferably in the range of 0.950 to 0.990.

When the ratio of the molar equivalent of the tetracarboxylic dianhydride to the diamine compound is 0.900 or more, the machine strength of the molded article easily increases. Further, when the ratio of the molar equivalent is 0.950 or more, the molecular weight of the polyimide precursor increases, and thus, for example, when forming the polyimide molded article in the shape of a film, the film strength (break strength and tensile strength) easily increases.

Here, in the specific polyimide precursor, the molar equivalent of the diamine compound and the molar equivalent of the tetracarboxylic dianhydride are measured in the following manner. The specific polyimide precursor resin is subjected to a hydrolysis treatment in a basic aqueous solution of sodium hydroxide and potassium hydroxide in order to be decomposed into diamine compound and tetracarboxylate. The obtained sample is analyzed by gas chromatography, liquid chromatography, or the like, and the proportions of the tetracarboxylic acid and the diamine compound constituting the specific polyimide precursor are determined.

Terminal Structure of Polyimide Precursor

The specific polyimide precursor preferably includes a polyimide precursor (resin) having an amino group on the terminal thereof, and preferably is a polyimide precursor having amino groups on all terminals thereof.

When the polyimide precursor (resin) having a terminal amino group is included, the machine strength of the polyimide molded article easily increases. Further, the dispersion of various fillers added so as to impart various functions to the polyimide molded article is promoted, and thus, superior functions are easily exhibited even with a small amount of the filler.

A part or all of the terminal amino groups of the polyimide precursor having a terminal amino group may be sealed with a dicarboxylic anhydride or the like. When the terminal amino groups are sealed, the storage stability of the polyimide precursor composition easily increases.

Examples of the dicarboxylic anhydride used to seal the terminal amino group include phthalic anhydride and fumaric anhydride.

The terminal amino group of the specific polyimide precursor is detected by allowing trifluoroacetic anhydride to undergo a reaction with a polyimide precursor composition (quantitative reaction with amino groups). That is, the terminal amino group of the specific polyimide precursor is amidated with trifluoroacetic acid. After the treatment, the specific polyimide precursor is purified by reprecipitation or the like to remove excessive residues of trifluoroacetic anhydride or trifluoroacetic acid. The specific polyimide precursor after the treatment is quantified by means of a nuclear magnetic resonance (NMR) method to measure the amount of the terminal amino groups of the specific polyimide precursor.

Number Average Molecular Weight of Polyimide Precursor

The number average molecular weight of the specific polyimide precursor is preferably from 1000 to 100,000, more preferably from 5000 to 50,000, and still more preferably from 10,000 to 30,000. When the number average molecular weight of the specific polyimide precursor is within the above range, a decrease in the solubility of the specific polyimide precursor in a solvent is prevented, and thus, the film forming properties are easily obtained.

Particularly, when the number average molecular weight of the specific polyimide precursor is 2000 or more (preferably 10,000 or more, and more preferably 15,000 or more), the mechanical strength of a molded article easily increases.

Furthermore, by adjusting the ratio of the molar equivalent of the tetracarboxylic dianhydride to the diamine compound, a specific polyimide precursor having a desired number average molecular weight is obtained.

The number average molecular weight of the specific polyimide precursor is measured by Gel Permeation Chromatography (GPC) under the following measurement conditions.

Column: TSKgelα-M (7.8 mm I.D.×30 cm) manufactured by Tosoh Corporation

Eluent: dimethylformamide (DMF)/30 mM LiBr/60 mM phosphoric acid

Flow rate: 0.6 mL/min

Injection amount: 60 μL

Detector: Differential refractive index detector (RI)

Content of Specific Polyimide Precursor

The content (concentration) of the specific polyimide precursor is preferably from 0.1% by weight to 40% by weight, more preferably from 0.5% by weight to 25% by weight, and still more preferably from 1% by weight to 20% by weight, based on the entire polyimide precursor composition.

Aqueous Solvent

The aqueous solvent is an aqueous solvent containing at least one kind selected from the group consisting of water and water-soluble alcohol solvent. Here, in the present specification, being water-soluble means that a subject substance dissolves in an amount of 1% by weight or more in water at 25° C.

It is preferable that the aqueous solvent contains at least one kind selected from the group consisting water and a water-soluble alcohol solvent in an amount of 5% by weight or more based on the entirety of the aqueous solvent and more preferable that the aqueous solvent contains at least one kind thereof in an amount of 10% by weight or more.

Here, in a case where a solvent other than water or a water-soluble alcohol solvent is contained as an aqueous solvent, a water-soluble organic solvent other than the water-soluble alcohol solvent is preferably used.

As the water-soluble organic solvent, a water-soluble ether solvent or a water-soluble ketone solvent may be exemplified.

The ratio (total of water and a water-soluble alcohol solvent/a water-soluble organic solvent other than the water-soluble alcohol solvent) of the total of water and a water-soluble alcohol solvent to a water-soluble organic solvent other than the water-soluble alcohol solvent is preferably in the range of 100/0 to 50/50, more preferably in the range of 100/0 to 60/40, and still more preferably in the range of 90/10 to 70/30, in terms of a weight ratio.

In a case where two kinds or more water-soluble organic solvents are used in combination, examples thereof include a combination of a water-soluble ether solvent and a water-soluble alcohol solvent, a combination of a water-soluble ketone solvent and a water-soluble alcohol solvent, and a combination of water-soluble ether solvent, a water-soluble ketone solvent, and a water-soluble alcohol solvent.

Examples of water include distilled water, ion-exchanged water, ultra-filtered water, and pure water.

The water-soluble alcohol solvent is a water-soluble solvent having an alcoholic hydroxyl group in one molecule. Examples of the water-soluble alcohol solvent include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these, methanol, ethanol, 2-propanol, and ethylene glycol are preferable as the water-soluble alcohol solvent.

The water-soluble ether solvent is a water-soluble solvent having an ether bond in one molecule. Examples of the water-soluble ether solvent include tetrahydrofuran (THF), dioxane, trioxane, 1,2-dimethoxyethane, diethylene glycol dimethyl ether, and diethylene glycol diethyl ether. Among these, tetrahydrofuran and dioxane are preferable as the water-soluble ether solvent.

The water-soluble ketone solvent is a water-soluble solvent having a ketone group in one molecule. Examples of the water-soluble ketone solvent include acetone, methyl ethyl ketone, and cyclohexanone. Among these, acetone is preferable as the water-soluble ketone solvent.

The boiling point of the water-soluble organic solvent is 160° C. or lower, preferably in the range of 40° C. to 150° C., and more preferably in the range of 50° C. to 120° C. When the boiling point of the solvent used in combination is within the above range, the solvent does not easily remain in a polyimide molded article, and a polyimide molded article having high mechanical strength is easily obtained.

Tertiary Amine Compound

The tertiary amine compound is a compound that increases the solubility with respect to the solvent through amine-chloridation of a specific polyimide precursor (carboxyl group thereof) and functions as an imidization accelerator.

In addition, the tertiary amine compound may be a water-soluble compound. Here, being water-soluble means that a subject substance dissolves in an amount of 1% by weight or more in water at 25° C.

As the tertiary amine compound, divalent or higher polyvalent amine compound in addition to a monovalent amine compound is exemplified. When a divalent or higher polyvalent amine compound is used, a pseudo-crosslinked structure is easily formed between molecules of a specific polyimide precursor, the viscosity of the polyimide composition is increased even in a case where the specific polyimide precursor is a low molecular weight substance, and the film forming properties are easily improved.

Examples of the tertiary amine compound include an aromatic tertiary amine compound and an aliphatic tertiary amine compound.

Examples of the aromatic tertiary amine compound include pyridines (amine compound having a pyridine skeleton), pyrimidines (amine compound having a pyrimidine skeleton), pyrazines (amine compound having a pyrazine skeleton), quinolines (amine compound having a quinoline skeleton), and imidazoles (amine compound having an imidazole skeleton).

Among these, pyridines and imidazoles are preferable.

Examples of pyridines include pyridine, α-picoline, β-picoline, γ-picoline, collidine, and lutidine.

Examples of imidazoles include imidazole, 1-methylimidazole, 2-methylimidazole, 1-ethylimidazole, 2-ethylimidazole, 1,2-dimethylimidazole, 2-ethyl-4-methylimidazole, 4-ethyl-2-methylimidazole, and 1-methyl-4-ethylimidazole.

Examples of the aliphatic tertiary amine compound include an aliphatic chain tertiary amine compound and an aliphatic cyclic tertiary amine compound.

Examples of the aliphatic chain tertiary amine compound include 2-dimethylaminoethanol, 2-diethylaminoethanol, 2-dimethylaminopropanol, triethanolamine, and triethylamine.

Examples of the aliphatic cyclic tertiary amine compound include piperidines (amine compound having a piperidine skeleton), piperazines (amine compound having a piperazine skeleton), morpholines (amine compound having a morpholine skeleton), pyrrolidines (amine compound having a pyrrolidine skeleton), and pyrazolidines (amine compound having a pyrazolidine skeleton).

Among these, piperidines represented by the following formula (1), piperazines represented by the following formula (2), morpholines represented by the following formula (3), pyrrolidines represented by the following formula (4), and pyrazolidines represented by the following formula (5) are preferable.

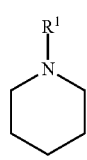

(1)

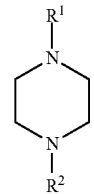

(2)

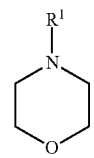

(3)

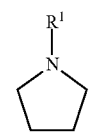

(4)

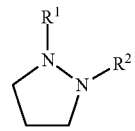

(5)

In the formulae (1) to (5), $R^1$ and $R^2$ each independently represent a hydrogen atom, an alkyl group having 1 to 6 carbon atoms, or a phenyl group.

As $R^1$ and $R^2$, a hydrogen atom, a methyl group, an ethyl group, a propyl group, a butyl group, a pentyl group, a hexyl group, or a phenyl group is preferable.

In this case, in the formulae (1), (3), and (4), $R^1$ represents a group other than a hydrogen atom. Further, in the formulae (2) and (5), at least one of $R^1$ and $R^2$ represents a group other than a hydrogen atom.

In terms of the film forming properties, a cyclic tertiary amine compound containing a nitrogen atom in a ring is preferable as the tertiary amine compound. Examples of the cyclic tertiary amine compound containing a nitrogen atom in a ring include pyridines, imidazoles, piperidines, piperazines, morpholines, pyrrolidines, and pyrazolidines.

In terms of the film forming properties, the dissociation constant pKb of the tertiary amine compound is more preferably in the range of 5.0 to 7.0 (preferably in the range of 5.1 to 6.9 and more preferably in the range of 5.5 to 6.7). From such a viewpoint, examples thereof include imidazoles and morpholines, and more specific examples thereof include 1,2-dimethylimidazole (pKb: 6.3 (experimental value)), 2-ethyl-4-methylimidazole (pKb: 5.9 (experimental value)), methyl morpholine (pKb: 6.6 (value in the literature of JP-A-2011-140569)), and ethyl morpholine (pKb: 6.3 (calculated value)).

Further, the dissociation constant pKb is measured using a potentiometric titration method.

In terms of the mechanical strength of a molded article, a tertiary amine compound not having a hydroxyl group, a primary amino group, and a secondary amino group is preferable as the tertiary amine compound. When the tertiary amine compound includes a hydroxyl group, a ring-opening esterification reaction of the first tetracarboxylic dianhydride may easily proceed. Meanwhile, when the tertiary amine compound includes a primary amino group or a secondary amino group, a hydrolysis reaction of the first tetracarboxylic dianhydride may easily proceed. For this reason, when the tertiary amine compound free from these groups is used, a polymerization reaction of the first tetracarboxylic dianhydride is hardly inhibited and thus imparting a high molecular weight to the polyimide precursor is easily promoted.

The content of the tertiary amine compound may be in the range of 50% by mole to 200% by mole, preferably in the range of 50% by mole to 150% by mole, and more preferably in the range of 100% by mole to 120% by mole, based on the carboxyl group (—COOH) of the polyimide precursor in the polyimide precursor composition. When the content of the tertiary amine compound is 50% by mole or more, the polyimide precursor may easily be dissolved in an aqueous solvent. When the content of the tertiary amine compound is 200% by mole or less, the solution stability of the polyimide precursor composition may easily be obtained and unpleasant odor may be prevented.

Other Additives

The polyimide precursor composition according to the present exemplary embodiment may contain various fillers and the like, so as to impart conductivity or various functions such as a mechanical strength to the polyimide molded article that is prepared using the composition. The polyimide precursor composition may also contain a catalyst for accelerating the imidization reaction, a leveling material for improving quality of the prepared film, and the like.

Examples of the conductive material added for imparting conductivity include a conductive material (having a volume resistivity of, for example, less than $10^7$ Ω·cm, the same shall apply hereinafter) and a semi-conductive material (having a volume resistivity of, for example, $10^7$ Ω·cm to $10^{13}$ Ω·cm, the same shall apply hereinafter), and the material is selected according to the purpose of use.

Examples of conductive materials include carbon black (for example, acidic carbon black having a pH of 5.0 or less), metals (for example, aluminum and nickel), metal oxides (for example, yttrium oxide and tin oxide), ion conductive substances (for example, potassium titanate and LiCl), and conductive polymers (for example, polyaniline, polypyrrole, polysulfone, and polyacetylene).

These conductive materials may be used alone or in combination of two or more kinds thereof.

In addition, in a case where the conductive material has a particle form, particles having a primary particle diameter thereof of less than 10 μm, and preferably 1 μm or less are preferable.

Examples of the filler added for enhancing the mechanical strength include materials having a particle form, such as silica powder, alumina powder, barium sulfate powder, titanium oxide powder, mica, and talc. In addition, in order to improve water repellency or releasability of the surface of a polyimide molded article, fluorine resin powder such as polytetrafluoroethylene (PTFE) and a tetrafluoroethylene-perfluoroalkyl vinyl ether copolymer (PFA), and the like may be added.

As the catalyst for accelerating the imidization reaction, a dehydrating agent such as an anhydride, an acid catalyst such as a phenol derivative, a sulfonic acid derivative, and a benzoic acid derivative, and the like may be used In order to improve the quality of the film prepared using the polyimide molded article, a surfactant may be added. As the surfactant to be used, any of cationic, anionic, and nonionic surfactants may be used.

The content of other additives may be selected according to the purpose of use of the polyimide molded article to be prepared.

Method for Preparing Polyimide Precursor Composition

The method for preparing a polyimide precursor composition according to the present exemplary embodiment includes a process of forming a polyimide precursor by adding a second tetracarboxylic dianhydride and a diamine compound to an aqueous solvent containing at least one kind selected from the group consisting of water and water-soluble alcohol and then additing the first tetracarboxylic dianhydride and a tertiary amine compound thereto.

Specifically, the process of forming a polyimide precursor is preferably any one of following processes (A) to (D).

Process of (A) (Formation of Prepolymer)

A process of (A) including:

a first process of adding a second tetracarboxylic dianhydride and a diamine compound to an aqueous solvent;

a second process of forming a prepolymer of a polyimide precursor by polycondensing the second tetracarboxylic dianhydride and the diamine compound after the first process;

a third process of adding the first tetracarboxylic dianhydride to the aqueous solvent after the second process;

a fourth process of adding a tertiary amine compound to the aqueous solvent after the third process; and a fifth process of forming a polyimide precursor by polycondensing the prepolymer and the first tetracarboxylic dianhydride after the fourth process.

Process of (B) (Formation of Prepolymer)

A process of (B) preferably including:

a first process of adding a second tetracarboxylic dianhydride and a diamine compound to an aqueous solvent;

a second process of forming a prepolymer of a polyimide precursor by polycondensing the second tetracarboxylic dianhydride and the diamine compound after the first process;

a third process of adding a tertiary amine compound to the aqueous solvent before or after the second process;

a fourth process of adding the first tetracarboxylic dianhydride to the aqueous solvent after the third process; and a fifth process of forming a polyimide precursor by polycondensing the prepolymer and the first tetracarboxylic dianhydride after the fourth process.

Process of (C) (Batch Polycondensation)

A process of (C) including:

a first process of adding a second tetracarboxylic dianhydride and a diamine compound to an aqueous solvent;

a second process of adding a first tetracarboxylic dianhydride to the aqueous solvent after the first process;

a third process of adding a tertiary amine compound to the aqueous solvent after the second process; and a fourth process of forming a polyimide precursor by polycondensing the first tetracarboxylic dianhydride, the second tetracarboxylic dianhydride, and the diamine compound after the third process.

Process of (D) (Batch Polycondensation)

A process of (D) including:

a first process of adding a second tetracarboxylic dianhydride and a diamine compound to an aqueous solvent;

a second process of adding a tertiary amine compound to the aqueous solvent after the first process;

a third process of adding the first tetracarboxylic dianhydride to the aqueous solvent after the second process; and a fourth process of forming a polyimide precursor by polycondensing the first tetracarboxylic dianhydride, the second tetracarboxylic dianhydride, and the diamine compound after the third process.

The polycondensation reaction that forms a polyimide precursor is performed under the presence of a tertiary amine compound in all processes of (A) to (D). For this reason, the progress of the hydrolysis reaction of a first tetracarboxylic dianhydride or the ring-opening esterification reaction is inhibited so that the polycondensation reaction may easily be promoted. In this manner, imparting a high molecular weight to the polyimide precursor to be formed is easily promoted. As a result, the mechanical strength of a molded article is increased.

Particularly, in regard to the processes (A) and (B), a prepolymer of a polyimide precursor having an amino group on the terminal thereof may be formed in the process of forming a prepolymer of a polyimide precursor composition. That is, a prepolymer of a polyimide precursor having a structure derived from a diamine compound on the terminal thereof may be formed.

In the processes (A) and (B), when a first tetracarboxylic dianhydride is added to a second tetracarboxylic dianhydride and a diamine compound (preferably a solvent dissolving a prepolymer and more preferably a solvent dissolving a prepolymer of a polyimide precursor having an amino group on the terminal thereof), the hydrolysis reaction or the ring-opening esterification reaction is suppressed and the polymerization reaction of the first tetracarboxylic dianhydride is easily promoted. In this manner, imparting a high molecular weight to the polyimide precursor to be formed is easily promoted. As a result, the mechanical strength of the molded article is increased.

When a prepolymer of the polyimide precursor having a terminal amino group is produced, each monomer may be added to the aqueous solvent, for example, at a blending ratio such that the molar equivalent of the diamine compound is higher than the molar equivalent of the second tetracarboxylic dianhydride.

The ratio of the molar equivalent of the diamine compound to the second tetracarboxylic dianhydride is such a ratio that the molar equivalent of the second tetracarboxylic dianhydride is preferably in the range of 0.05 to 0.6, and more preferably in the range of 0.1 to 0.55.

Furthermore, the number average molecular weight of the prepolymer of the resulting polyimide precursor composition is preferably in the range of 100 to 1000, and more preferably in the range of 200 to 600.

The reaction temperature during the polymerization reaction of the polyimide precursor and prepolymer of the polyimide precursor is, for example, preferably from 0° C. to 70° C., more preferably from 10° C. to 60° C., and still more preferably from 20° C. to 55° C. If the reaction temperature is controlled to be 0° C. or higher, the progress of the polymerization reaction is accelerated. Accordingly, the time taken for the reaction is shortened and the productivity is easily improved. On the other hand, if the reaction temperature is controlled to be 70° C. or less, the progress of the imidization reaction caused in the molecule of the formed polyimide precursor is prevented. Accordingly, precipitation or gelation caused by decrease in the solubility of the polyimide precursor and the prepolymer of the polyimide precursor is easily suppressed.

In addition, the time of the polymerization reaction of the polyimide precursor and the prepolymer of the polyimide precursor is preferably in the range of 1 hour to 24 hours in total according to the reaction temperature.

Here, in the method for preparing the polyimide precursor composition according to the present exemplary embodiment, an aprotic polar solvent which is responsible for a decrease in the mechanical strength of a polyimide molded article is not used, or the preparation of the polyimide precursor is carried out in a reduced amount of an aqueous solvent.

For this reason, in the method for preparing the polyimide precursor composition according to the present exemplary embodiment, a polyimide precursor composition from which a polyimide molded article having a high mechanical strength is obtained, is prepared.

Furthermore, in the method for preparing the polyimide precursor composition according to the present exemplary embodiment, a polyimide precursor composition, from which a polyimide molded article having excellent characteristics such as heat resistance, electrical characteristics, and solvent resistance, in addition to the mechanical strength, is easily obtained, is prepared.

Moreover, in the method for preparing the polyimide precursor composition according to the present exemplary embodiment, since an aqueous solvent is applied as a solvent, a polyimide precursor composition is prepared with high productivity.

Method for preparing Polyimide Molded article

The method for preparing the polyimide molded article according to the present exemplary embodiment is a method for preparing a polyimide molded article, in which the polyimide precursor composition according to the present exemplary embodiment (hereinafter also referred to as a "specific polyimide precursor composition") is subjected to a heating treatment for molding.

Specifically, the method for preparing the polyimide molded article according to the present exemplary embodiment has, for example, a process in which a specific polyimide precursor composition is coated onto an object to be coated, thereby forming a coating film (hereinafter referred to as a "coating film forming process"), and a process in which the coating film is subjected to a heating treatment, thereby forming a polyimide resin layer (hereinafter referred to a "heating process").

Coating Film Forming Process

First, an object to be coated is prepared. This object to be coated is selected according to the applications of a polyimide molded article to be prepared.

Specifically, in a case where a liquid crystal alignment film is prepared as a polyimide molded article, examples of the object to be coated include various substrates applied in liquid crystal elements, and examples thereof include a silicon substrate, a glass substrate, or substrates having a metal or alloy formed on the surface of these substrates.

Furthermore, in a case where a passivation film is prepared as a polyimide molded article, the object to be coated is selected from, for example, a semiconductor substrate having an integrated circuit formed thereon, a wiring substrate having wires formed thereon, a printed substrate having electronic parts and a wiring board provided thereon, and the like.

In addition, in a case where an electrical wire coating material is prepared as a polyimide molded article, examples of the object to be coated include various electrical wires (wires, bars, or plates of metals or alloys such as soft copper, hard copper, oxygen-free copper, chromium ore, and aluminum). Further, in a case where the polyimide molded article is molded and processed into a tape form, and used as a coating material for wires in the form of a tape that is wound onto the wire, various planar substrates or cylindrical substrates are used as the object to be coated.

In addition, in a case where an adhesive film is prepared as a polyimide molded article, examples thereof include various molded articles which are objects to be adhered (for example, various electrical parts such as a semiconductor chip and a printed substrate).

Next, the specific polyimide precursor composition is coated onto a desired object to be coated to form a coating film of the specific polyimide precursor composition.

The method for coating the specific polyimide precursor composition is not particularly limited, and examples thereof include various coating methods such as a spray coating method, a spin coating method, a roll coating method, a bar coating method, a slit die coating method, and an ink jet coating method.

Heating Process

Next, the coating film of the specific polyimide precursor composition is subjected to a drying treatment. By this drying treatment, a dried film (dried film before imidization) is formed.

For the heating conditions for the drying treatment, the heating temperature is, for example, preferably from 80° C. to 200° C., the heating time is preferably from 10 minutes to 60 minutes, and when the temperature is higher, the heating time may be shorter. During the heating, hot air blowing is also effective. During the heating, the temperature may be raised stepwise or raised without changing the rate.

Next, the dried film is subjected to an imidization treatment. Thus, a polyimide resin layer is formed.

For the heating conditions for the imidization treatment, the imidization reaction occurs, for example, by heating at 150° C. to 400° C. (preferably 200° C. to 300° C.) for 20 minutes to 60 minutes, thereby forming a polyimide resin layer. During the heating reaction, heating is preferably carried out by raising the temperature stepwise or at a constant rate before reaching the final temperature of heating.

Through the processes above, a polyimide molded article is formed. Further, if desired, a polyimide molded article is extracted from the object to be coated and subjected to a post-processing.

Polyimide Molded Article

The polyimide molded article according to the present exemplary embodiment is a polyimide molded article molded by subjecting the polyimide precursor composition according to the present exemplary embodiment to a heating treatment. That is, the polyimide molded article according to the present exemplary embodiment is a polyimide molded article obtained by the method for preparing the polyimide molded article according to the present exemplary embodiment. Examples of this polyimide molded article include various polyimide molded articles such as a liquid crystal alignment film, a passivation film, an electrical wire coating material, and an adhesive film. Other examples of the polyimide molded article include a flexible electronic-substrate film, a copper-clad laminated film, a laminate film, an electrical insulation film, a porous film for a fuel cell, a separation film, a heat-resistant film, an IC package, a resist film, a flattened film, a microlens-array film, and an optical-fiber-coating film.

Other examples of the polyimide molded article include a belt member. Examples of the belt member include a driving belt, a belt for an electrophotographic image forming apparatus (for example, an intermediate transfer belt, a transfer belt, a fixing belt, and a transport belt).

That is, the method for preparing the polyimide molded article according to the present exemplary embodiment may be applied as various methods for producing polyimide molded articles as exemplified above.

The polyimide molded article according to the present exemplary embodiment includes the aqueous solvent included in the specific polyimide precursor composition.

The amount of the aqueous solvent contained in the polyimide molded article according to the present exemplary embodiment is 1 ppb or more and less than 1% in the polyimide molded article. The amount of the aqueous solvent contained in the polyimide molded article is determined by heating the polyimide molded article and performing gas chromatography on the content of gas generated.

EXAMPLES

Hereinafter, the present invention will be described with reference to Examples, but the invention is not limited to these Examples. Further, in the description below, both of "parts" and "%" are based on weight unless specified otherwise.

Example 1

Preparation of Polyimide Precursor Composition (B-1)

856.78 g of water is filled into a flask equipped with a stirring rod, a thermometer, and a dropping funnel. 43.65 g (217.99 mmol) of 4,4'-diaminodiphenyl ether (hereinafter denoted as ODA: molecular weight of 200.24) is added thereto, and the mixture is stirred for 30 minutes while heating to 40° C. 37.71 g (128.17 mmol) of 3,3',4,4'-biphenyltetracarboxylic dianhydride (hereinafter denoted as BPDA: molecular weight of 294.22) is added thereto. 43.22 g (427.26 mmol) of methyl morpholine (hereinafter, denoted as MMO: molecular weight of 101.15) is added thereto as an amine compound using a dropping funnel. Subsequently, the mixture is subjected to a stirring reaction at 40° C. for 30 minutes. Thus, a prepolymer of the polyimide precursor is produced. After confirming that this prepolymer and the raw material monomer are dissolved, 18.64 g (85.46 mmol) of pyromellitic dianhydride (hereinafter denoted as PMDA: molecular weight of 218.12) is slowly added thereto in a form of powder, and the mixture is reacted at 40° C. for 24 hours, thereby obtaining a polyimide precursor composition (B-1). The characteristics and the liquid state of the polyimide precursor composition (B-1) are shown in Table 1.

In addition, the imidization rate of the formed polyimide precursor is 0.04, and, as a result of measuring the amount of terminal amino groups as described above, it is found that the polyimide precursor contains at least an amino group on the terminal thereof.

Furthermore, the respective measurements are performed as below.

Method for Solid Content Measurement

The solid content is measured using a Thermo Gravimetry/Differential Thermal Analyzer under the following conditions. Further, the value measured at 380° C. is used and the solid content is measured as a proportion of the solid content as polyimide.

Measurement instrument: Thermo Gravimetry/Differential Thermal Analyzer TG/DTA 6200 (Seiko Instruments Inc.)

Measurement range: 20° C. to 400° C.

Rate of temperature increase: 20° C./min

Evaluation

The obtained polyimide precursor composition (B-1) is used to prepare a film, and the film thus prepared is evaluated on film forming properties. Moreover, the mechanical strength (tensile strength and tensile elongation) of the obtained film is measured.

Film Forming Method

Coating is carried out by a bar coating method using a coating blade equipped with a space to yield a thickness after coating of 500 μm.

Coating substrate: 1.1 mmt glass plate
Drying temperature: 60° C. for 10 minutes
Baking temperature: 250° C. for 30 minutes Film Forming Properties The prepared film is evaluated in terms of (1) void marks and (2) surface unevenness/pattern.

(1) Void Marks

The presence of void marks on the surface of the prepared film is evaluated. The evaluation criteria are as follows.

A: No void marks are found.

B: It is possible to confirm 1 or more and less than 10 void marks on the surface of the prepared film.

C: There are 10 or more and less than 50 void marks scattered on the surface of the prepared film.

D: Numerous void marks are evenly generated on the surface of the prepared film.

(2) Surface Unevenness/Pattern

The presence of surface unevenness and patterns on the surface of the prepared film is evaluated. The evaluation criteria are as follows.

A: Generation of surface unevenness and patterns is not found.

B: It is possible to confirm surface unevenness and patterns to a slight extent in a portion of the surface of the prepared film (less than 10% of the surface area of the prepared film).

C: It is possible to confirm surface unevenness and patterns in a portion of the surface of the prepared film.

D: Surface unevenness and patterns are evenly generated on the surface of the prepared film (10% or more of the surface area of the prepared film).

Tensile Strength/Elongation

From the prepared film, a piece of sample is molded by punching by using a No. 3 dumbbell. The piece of sample is installed in a tensile tester, and under the following conditions, an applied load (tensile strength) at which the sample undergoes tensile breaking and elongation at break (tensile elongation) are measured.

Measurement instrument: Tensile tester 1605 model manufactured by Aikoh Engineering Co., Ltd.

Sample length: 30 mm
Sample width: 5 mm
Tensile rate: 10 mm/min

Examples 2 to 17 and 19 to 29

Preparation of Polyimide Precursor Compositions (B-2) to (B-17) and (B-19) to (B-29)

Polyimide precursor compositions (B-2) to (B-17) and (B-19) to (B-29) are prepared in the same manner as that of Example 1 except that the conditions for preparation of the polyimide precursor composition are changed to the conditions listed in Tables 1 to 8 below.

The evaluation is performed in the same manner as that of Example 1 using the obtained polyimide precursor compositions (B-2) to (B-17) and (B-19) to (B-29). The evaluation results are listed in Tables 1 to 8.

Example 18

Preparation of Polyimide Precursor Composition (B-18)

426.89 g of water and 426.89 g of tetrahydrofurfuryl alcohol (hereinafter, denoted as THFA) are filled into a flask equipped with a stirring rod, a thermometer, and a dropping funnel. 46.69 g (233.15 mmol) of 4,4'-diaminodiphenyl ether (hereinafter denoted as ODA: molecular weight of 200.24) is added thereto, and the mixture is stirred for 30 minutes while heating to 80° C. 13.44 g (45.70 mmol) of 3,3',4,4'-biphenyltetracarboxylic dianhydride (hereinafter denoted as BPDA: molecular weight of 294.22) is added thereto. After confirming that the raw material is dissolved, 39.87 g (182.79 mmol) of pyromellitic dianhydride (hereinafter denoted as PMDA: molecular weight of 218.12) is slowly added thereto in a form of powder. The mixture is subjected to a stirring reaction at 80° C. for 30 minutes. 46.22 g (456.97 mmol) of methyl morpholine (hereinafter, denoted as MMO: molecular weight of 101.15) is slowly added thereto as an amine compound using a dropping funnel. The mixture is reacted at 80° C. for 24 hours, thereby obtaining a polyimide precursor composition (B-18).

The evaluation is performed in the same manner as that of Example 1 using the obtained polyimide precursor composition (B-18). The evaluation results are listed in Table 5.

Comparative Example 1

Preparation of Polyimide Precursor Composition (Y-1)

900 g of N-methyl-2-pyrrolidone (hereinafter, denoted as NMP) is filled into a flask equipped with a stirring rod, a thermometer, and a dropping funnel. 46.69 g (233.15 mmol) of ODA is added thereto, and the mixture is stirred for 30 minutes while heating to 40° C. 13.44 g (45.70 mmol) of BPDA and 39.87 g (182.79 mmol) of PMDA are added thereto and the mixture is reacted for 24 hours at 40° C., thereby obtaining a polyimide precursor composition (Y-1).

In addition, the imidization rate of the formed polyimide precursor is 0.03, and, as a result of measuring the amount of terminal amino groups as described above, it is found that the polyimide precursor contains at least an amino group on the terminal thereof.

Using the obtained polyimide precursor composition (Y-1), the evaluation is carried out in the same manner as in Example 1. The evaluation results are shown in Table 9.

As a result, when the baking temperature thereof is set to 250° C. as in Example 1, NMP remains in the film. Accordingly, both the tensile strength and the tensile elongation are lowered, as compared to Example 3. As one of the reasons for this, it is considered that NMP having a high boiling point contained in the polyimide precursor composition (Y-1) remains in the prepared film, whereby the mechanical strength is reduced.

Comparative Example 2

Preparation of Polyimide Precursor Composition (Y-2)

853.78 g of NMP is filled into a flask equipped with a stirring rod, a thermometer, and a dropping funnel. 46.69 g (233.15 mmol) of ODA is added thereto, and the mixture is stirred for 30 minutes while heating to 40° C. 13.44 g (45.70 mmol) of BPDA and 46.22 g (4456.97 mmol) of MMO are added dropwise thereto, the mixture is stirred for 30 minutes, and 39.87 g (182.79 mmol) of PMDA is slowly added in a form of powder. The mixture is reacted for 24 hours at 40° C., thereby obtaining a polyimide precursor composition (Y-2).

In addition, the imidization rate of the formed polyimide precursor is 0.03, and, as a result of measuring the amount of terminal amino groups as described above, it is found that the polyimide precursor contains at least an amino group on the terminal thereof.

The evaluation is performed in the same manner as that of Example 1 using the obtained polyimide precursor composition (Y-2). The evaluation results are listed in Table 9.

As a result, when the baking temperature thereof is set to 250° C. as in Comparative Example 1, NMP remains in the film. Accordingly, both the tensile strength and the tensile elongation are lowered, as compared to Example 3.

Comparative Examples 3 and 4

Preparation of Polyimide Precursor Compositions (Y-3) and (Y-4)

Polyimide precursor compositions (Y-2) to (Y-4) are prepared in the same manner as that of Comparative Example 2 except that the conditions for the solvent of the polyimide precursor composition are changed to the conditions listed in Table 9.

The obtained polyimide precursor compositions (Y-2) to (Y-4) do not dissolve the raw material added, causing non-uniformity, and thus, a film cannot be prepared.

Comparative Example 5

Preparation of Polyimide Precursor Composition (Y-5)

900 g of water is filled into a flask equipped with a stirring rod, a thermometer, and a dropping funnel. 46.69 g (233.15 mmol) of ODA is added thereto, and the mixture is stirred for 30 minutes while heating to 40° C. 13.44 g (45.70 mmol) of BPDA and 39.87 g (182.79 mmol) of PMDA are added thereto at the same time, the mixture is reacted for 24 hours at 40° C., thereby obtaining a polyimide precursor composition (Y-5).

The evaluation is performed in the same manner as that of Example 1 using the obtained polyimide precursor composition (Y-5). The evaluation results are listed in Table 10.

The obtained polyimide precursor composition (Y-5) does not dissolve the raw material added, causing non-uniformity, and thus, a film cannot be prepared.

Comparative Example 6

Preparation of Polyimide Precursor Composition (Y-6)

852.11 g of water is filled into a flask equipped with a stirring rod, a thermometer, and a dropping funnel. 43.37 g (241.55 mmol) of ODA is added thereto, and the mixture is stirred for 30 minutes while heating to 40° C. 51.63 g (236.72 mmol) of PMDA is added thereto and 47.89 g of MMO (473.44 mmol) is added dropwise thereto, and the mixture is reacted for 24 hours at 40° C., thereby obtaining a polyimide precursor composition (Y-6).

The evaluation is performed in the same manner as that of Example 1 using the obtained polyimide precursor composition (Y-6). The evaluation results are listed in Table 10.

It is confirmed that the obtained polyimide precursor composition (Y-6) has a low viscosity, and as a result of testing for the molecular weight, polymerization does not proceed in most cases. Further, the film forming properties are deteriorated and most of the samples are broken without elongation as a result of the tensile test.

TABLE 1

|  |  | Example | | | |
| --- | --- | --- | --- | --- | --- |
|  |  | Example 1 | Example 2 | Example 3 | Example 4 |
| Polyimide precursor composition | | B-1 | B-2 | B-3 | B-4 |
| Tetracarboxylic dianhydride | PMDA | 18.64 g<br>85.46 mmol | 28.90 g<br>132.48 mmol | 39.87 g<br>182.79 mmol | 45.65 g<br>209.27 mmol |
| | BPDA | 37.71 g<br>128.17 mmol | 25.99 g<br>88.32 mmol | 13.44 g<br>45.70 mmol | 6.84 g<br>23.25 mmol |
| | BTDA | — | — | — | — |
| Diamine compound | PDA | — | — | — | — |
| | ODA | 43.65 g<br>217.99 mmol | 45.12 g<br>225.31 mmol | 46.69 g<br>233.15 mmol | 47.51 g<br>237.27 mmol |
| | BAPP | — | — | — | — |
| Terminal sealing agent | PA | — | — | — | — |
| Solvent | THF | — | — | — | — |
| | THFA | — | — | — | — |
| | Acetone | — | — | — | — |
| | MeOH | — | — | — | — |
| | IPA | — | — | — | — |
| | Water | 856.78 g | 855.33 g | 853.78 g | 852.96 g |
| Tertiary amine compound | MMO | 43.22 g<br>427.26 mmol | 44.67 g<br>441.61 mmol | 46.22 g<br>456.97 mmol | 47.04 g<br>465.05 mmol |
| | DMZ | — | — | — | — |
| Solid content (% by weight) | | 10 | 10 | 10 | 10 |
| Ratio between molar equivalents (tetracarboxylic dianhydride/diamine compound) | | 0.98 | 0.98 | 0.98 | 0.98 |

TABLE 1-continued

|  |  | Example 1 | Example 2 | Example 3 | Example 4 |
|---|---|---|---|---|---|
| Compositional ratio of tetracarboxylic acids (mol/mol) | | PMDA/BPDA 40/60 | PMDA/BPDA 60/40 | PMDA/BPDA 80/20 | PMDA/BPDA 90/10 |
| Diamine compound | | ODA 100 | ODA 100 | ODA 100 | ODA 100 |
| Tertiary amine compound (% by mole/COOH with respect to polyimide precursor) | | MMO 100 | MMO 100 | MMO 100 | MMO 100 |
| Terminal structure | | Amine terminal | Amine terminal | Amine terminal | Amine terminal |
| Ratio of solvents (weight ratio) | | Water 100 | Water 100 | Water 100 | Water 100 |
| State of composition liquid | | Dissolved | Dissolved | Dissolved | Dissolved |
| Number average molecular weight Mn | | 19,000 | 17,000 | 15,000 | 14,000 |
| Imidization rate | | 0.04 | 0.04 | 0.04 | 0.04 |
| Film forming properties | Void marks | A | A | A | A |
|  | Surface unevenness/pattern | A | A | A | A |
| Mechanical strength | Tensile strength (N/mm$^2$) | 162 | 168 | 174 | 177 |
|  | Tensile elongation (%) | 94 | 106 | 118 | 124 |

TABLE 2

|  |  | Example 5 | Example 6 | Example 7 | Example 8 |
|---|---|---|---|---|---|
| Polyimide precursor composition | | B-5 | B-6 | B-7 | B-8 |
| Tetracarboxylic dianhydride | PMDA | 13.76 g 63.06 mmol | 23.36 g 107.08 mmol | 15.83 g 72.56 mmol | 15.83 g 72.56 mmol |
|  | BPDA | 43.29 g 147.15 mmol | 31.50 g 107.08 mmol | — | — |
|  | BTDA | — | — | 23.38 g 72.56 mmol | 23.38 g 72.56 mmol |
| Diamine compound | PDA | — | — | — | — |
|  | ODA | 42.95 g 214.50 mmol | 45.14 g 225.43 mmol | | |
|  | BAPP | — | — | 60.79 g 148.09 mmol | 60.79 g 148.09 mmol |
| Terminal sealing agent | PA | — | — | — | — |
| Solvent | THF | — | — | 426.89 g | 341.51 g |
|  | THFA | — | — | — | — |
|  | Acetone | — | — | — | — |
|  | MeOH | — | — | — | — |
|  | IPA | — | — | — | — |
|  | Water | 857.47 g | 856.68 g | 426.89 g | 512.27 g |
| Tertiary amine compound | MMO | 42.53 g 420.42 mmol | 43.32 g 428.32 mmol | 14.68 g 145.13 mmol | 46.22 g 465.97 mmol |
|  | DMZ | — | — | — | — |
| Solid content (% by weight) | | 10 | 10 | 10 | 10 |
| Ratio between molar equivalents (tetracarboxylic dianhydride/diamine compound) | | 0.98 | 0.95 | 0.98 | 0.98 |
| Compositional ratio of tetracarboxylic acids (mol/mol) | | PMDA/BPDA 30/70 | PMDA/BPDA 50/50 | PMDA/BTDA 50/50 | PMDA/BTDA 50/50 |
| Diamine compound | | ODA 100 | ODA 100 | BAPP 100 | BAPP 100 |
| Tertiary amine compound (% by mole/COOH with respect to polyimide precursor) | | MMO 100 | MMO 100 | MMO 50 | MMO 50 |
| Terminal structure | | Amine terminal | Amine terminal | Amine terminal | Amine terminal |
| Ratio of solvents (weight ratio) | | Water 100 | Water 100 | Water/THF 50/50 | Water/THF 60/40 |
| State of composition liquid | | Dissolved | Dissolved | Dissolved | Dissolved |
| Number average molecular weight Mn | | 21,000 | 2,000 | 18,000 | 18,000 |
| Imidization rate | | 0.04 | 0.05 | 0.04 | 0.04 |
| Film forming properties | Void marks | A | A | A | A |
|  | Surface unevenness/pattern | A | A | A | A |
| Mechanical strength | Tensile strength (N/mm$^2$) | 159 | 165 | 120 | 165 |
|  | Tensile elongation (%) | 88 | 100 | 120 | 100 |

TABLE 3

| | | Example 9 | Example 10 | Example 11 | Example 12 |
|---|---|---|---|---|---|
| Polyimide precursor composition | | B-9 | B-10 | B-11 | B-12 |
| Tetracarboxylic dianhydride | PMDA | 15.83 g 72.56 mmol | 15.83 g 72.56 mmol | 39.87 g 182.79 mmol | 39.87 g 182.79 mmol |
| | BPDA | — | — | 13.44 g 45.70 mmol | 13.44 g 45.70 mmol |
| | BTDA | 23.38 g 72.56 mmol | 23.38 g 72.56 mmol | — | — |
| Diamine compound | PDA | — | — | — | — |
| | ODA | — | — | 46.69 g 233.15 mmol | 46.69 g 233.15 mmol |
| | BAPP | 60.79 g 148.09 mmol | 60.79 g 148.09 mmol | — | — |
| Terminal sealing agent | PA | — | — | — | — |
| Solvent | THF | 85.38 g | 256.13 g | — | — |
| | THFA | — | — | 253.02 g | 249.20 g |
| | Acetone | — | — | — | — |
| | MeOH | — | — | — | — |
| | IPA | — | — | — | — |
| | Water | 768.40 g | 597.65 g | 590.38 g | 581.47 g |
| Tertiary amine compound | MMO | 46.22 g 456.97 mmol | 46.22 g 456.97 mmol | 56.60 g 559.56 mmol | 69.33 g 685.46 mmol |
| | DMZ | — | — | — | — |
| Solid content (% by weight) | | 10 | 10 | 10 | 10 |
| Ratio between molar equivalents (tetracarboxylic dianhydride/diamine compound) | | 0.98 | 0.98 | 0.98 | 0.98 |
| Compositional ratio of tetracarboxylic acids (mol/mol) | | PMDA/BTDA 30/70 | PMDA/BPDA 50/50 | PMDA/BPDA 80/20 | PMDA/BTDA 80/20 |
| Diamine compound | | BAPP 100 | BAPP 100 | ODA 100 | ODA 100 |
| Tertiary amine compound (% by mole/COOH with respect to polyimide precursor) | | MMO 50 | MMO 50 | MMO 120 | MMO 150 |
| Terminal structure | | Amine terminal | Amine terminal | Amine terminal | Amine terminal |
| Ratio of solvents (weight ratio) | | Water/THF 90/10 | Water/THF 70/30 | Water/THFA 70/30 | Water/THFA 70/30 |
| State of composition liquid | | Dissolved | Dissolved | Dissolved | Dissolved |
| Number average molecular weight Mn | | 18,000 | 18,000 | 14,000 | 13,000 |
| Imidization rate | | 0.04 | 0.04 | 0.04 | 0.04 |
| Film forming properties | Void marks | A | A | A | A |
| | Surface unevenness/pattern | A | A | A | A |
| Mechanical strength | Tensile strength (N/mm$^2$) | 165 | 165 | 174 | 174 |
| | Tensile elongation (%) | 100 | 100 | 118 | 118 |

TABLE 4

| | | Example 13 | Example 14 | Example 15 | Example 16 |
|---|---|---|---|---|---|
| Polyimide precursor composition | | B-13 | B-14 | B-15 | B-16 |
| Tetracarboxylic dianhydride | PMDA | 39.87 g 182.79 mmol | 15.83 g 72.56 mmol | 15.83 g 72.56 mmol | 15.83 g 72.56 mmol |
| | BPDA | 13.44 g 45.70 mmol | — | — | — |
| | BTDA | — | 23.38 g 72.56 mmol | 23.38 g 72.56 mmol | 23.38 g 72.56 mmol |
| Diamine compound | PDA | — | — | — | — |
| | ODA | 46.69 g 233.15 mmol | — | — | — |
| | BAPP | — | 60.79 g 148.09 mmol | 60.79 g 148.09 mmol | 60.79 g 148.09 mmol |
| Terminal sealing agent | PA | — | — | — | — |
| Solvent | THF | — | — | 261.12 g | — |
| | THFA | 242.27 g | — | — | — |
| | Acetone | — | 261.12 g | — | 261.12 g |
| | MeOH | — | — | 609.45 g | 609.45 g |
| | IPA | — | — | — | — |
| | Water | 565.29 g | 609.45 g | — | — |

TABLE 4-continued

|  |  | Example 13 | Example 14 | Example 15 | Example 16 |
|---|---|---|---|---|---|
| Tertiary amine compound | MMO | 92.45 g<br>913.95 mmol | 29.36 g<br>290.26 mmol | 29.36 g<br>290.26 mmol | 29.36 g<br>290.26 mmol |
|  | DMZ | — | — | — | — |
| Solid content (% by weight) |  | 10 | 10 | 10 | 10 |
| Ratio between molar equivalents (tetracarboxylic dianhydride/diamine compound) |  | 0.98 | 0.98 | 0.98 | 0.98 |
| Compositional ratio of tetracarboxylic acids (mol/mol) |  | PMDA/BPDA<br>80/20 | PMDA/BTDA<br>50/50 | PMDA/BTDA<br>50/50 | PMDA/BTDA<br>50/50 |
| Diamine compound |  | ODA<br>100 | BAPP<br>100 | BAPP<br>100 | BAPP<br>100 |
| Tertiary amine compound (% by mole/COOH with respect to polyimide precursor) |  | MMO<br>200 | MMO<br>100 | MMO<br>100 | MMO<br>100 |
| Terminal structure |  | Amine terminal | Amine terminal | Amine terminal | Amine terminal |
| Ratio of solvents (weight ratio) |  | Water/THFA<br>70/30 | Water/acetone<br>70/30 | MeOH/THF<br>70/30 | MeOH/acetone<br>70/30 |
| State of composition liquid |  | Dissolved | Dissolved | Dissolved | Dissolved |
| Number average molecular weight Mn |  | 12,000 | 18,000 | 18,000 | 18,000 |
| Imidization rate |  | 0.04 | 0.45 | 0.04 | 0.04 |
| Film forming properties | Void marks | A | A | A | A |
|  | Surface unevenness/pattern | A | A | A | A |
| Mechanical strength | Tensile strength (N/mm$^2$) | 174 | 165 | 165 | 165 |
|  | Tensile elongation (%) | 118 | 100 | 100 | 100 |

TABLE 5

|  |  | Example 17 | Example 18 | Example 19 | Example 20 |
|---|---|---|---|---|---|
| Polyimide precursor composition |  | B-17 | B-18 | B-19 | B-20 |
| Tetracarboxylic dianhydride | PMDA | 15.83 g<br>72.56 mmol | 39.87 g<br>182.79 mmol | 39.87 g<br>182.79 mmol | 39.87 g<br>182.79 mmol |
|  | BPDA | — | 13.44 g<br>45.70 mmol | 13.44 g<br>45.70 mmol | 13.44 g<br>45.70 mmol |
|  | BTDA | 23.38 g<br>72.56 mmol | — | — | — |
| Diamine compound | PDA | — | — | — | — |
|  | ODA | — | 46.69 g<br>233.15 mmol | 46.69 g<br>233.15 mmol | 46.69 g<br>233.15 mmol |
|  | BAPP | 60.79 g<br>148.09 mmol | — | — | — |
| Terminal sealing agent | PA | — | — | — | — |
| Solvent | THF | — | — | — | — |
|  | THFA | 261.12 g | 426.89 g | — | — |
|  | Acetone | — | — | — | — |
|  | MeOH | 609.45 g | — | — | — |
|  | IPA | — | — | — | — |
|  | Water | — | 426.89 g | 854.01 g | 855.18 g |
| Tertiary amine compound | MMO | 29.36 g<br>290.26 mmol | 46.22 g<br>456.97 mmol | 23.58 g<br>233.13 mmol | — |
|  | DMZ | — | — | 22.41 g<br>233.13 mmol | 44.82 g<br>466.26 mmol |
| Solid content (% by weight) |  | 10 | 10 | 10 | 10 |
| Ratio between molar equivalents (tetracarboxylic dianhydride/diamine compound) |  | 0.98 | 0.98 | 0.98 | 0.98 |
| Compositional ratio of tetracarboxylic acids (mol/mol) |  | PMDA/BTDA<br>50/50 | PMDA/BPDA<br>80/20 | PMDA/BPDA<br>80120 | PMDA/BPDA<br>80/20 |
| Diamine compound |  | BAPP<br>100 | ODA<br>100 | ODA<br>100 | ODA<br>100 |
| Tertiary amine compound (% by mole/COOH with respect to polyimide precursor) |  | MMO<br>100 | MMO<br>100 | MMO 50<br>DMZ 50 | DMZ<br>100 |
| Terminal structure |  | Amine terminal | Amine terminal | Amine terminal | Amine terminal |
| Ratio of solvents (weight ratio) |  | MeOH/THFA<br>70/30 | Water/THFA<br>50/50 | Water<br>100 | Water<br>100 |
| State of composition liquid |  | Dissolved | Dissolved | Dissolved | Dissolved |
| Number average molecular weight Mn |  | 18,000 | 12,000 | 10,000 | 8,000 |
| Imidization rate |  | 0.04 | 0.05 | 0.02 | 0.02 |

TABLE 5-continued

|  |  | Example | | | |
|---|---|---|---|---|---|
|  |  | Example 17 | Example 18 | Example 19 | Example 20 |
| Film forming properties | Void marks | A | A | B | C |
|  | Surface unevenness/pattern | A | A | B | C |
| Mechanical strength | Tensile strength (N/mm$^2$) | 165 | 160 | 120 | 120 |
|  | Tensile elongation (%) | 100 | 100 | 100 | 90 |

TABLE 6

|  |  | Example | | | |
|---|---|---|---|---|---|
|  |  | Example 21 | Example 22 | Example 23 | Example 24 |
| Polyimide precursor composition |  | B-21 | B-22 | B-23 | B-24 |
| Tetracarboxylic dianhydride | PMDA | 13.68 g 62.72 mmol | 23.68 g 108.58 mmol | 23.68 g 108.58 mmol | 36.08.68 g 164.41 mmol |
|  | BPDA | — | 31.95 g 108.58 mmol | 31.95 g 108.58 mmol | 12.17 g 41.35 mmol |
|  | BTDA | 30.31 g 94.08 mmol | — | — | — |
| Diamine compound | PDA | 3.46 g 32.00 mmol | — | — | — |
|  | ODA | — | 44.37 g 221.59 mmol | 44.37 g 221.59 mmol | 51.75 g 258.46 mmol |
|  | BAPP | 52.54 g 128.00 mmol | — | — | — |
| Terminal sealing agent | PA | — | 0.33 g 2.20 mmol | 0.66 g 4.43 mmol | — |
| Solvent | THF | — | — | — | — |
|  | THFA | — | — | — | — |
|  | Acetone | — | — | — | — |
|  | MeOH | — | — | — | — |
|  | IPA | — | — | — | — |
|  | Water | 868.28 g | 855.62 g | 855.62 g | 848.76 g |
| Tertiary amine compound | MMO | 31.72 g 313.60 mmol | 44.38 g 438.78 mmol | 44.83 g 443.20 mmol | 51.24 g 506.58 mmol |
|  | DMZ | — | — | — | — |
| Solid content (% by weight) |  | 10 | 10 | 10 | 10 |
| Ratio between molar equivalents (tetracarboxylic dianhydride/diamine compound) |  | 0.98 | 0.98 | 0.98 | 0.8 |
| Compositional ratio of tetracarboxylic acids (mol/mol) |  | PMDA/BTDA 40/60 | PMDA/BPDA 50/50 | PMDA/BPDA 50/50 | PMDA/BPDA 80/20 |
| Diamine compound |  | PDA/BAPP 20/80 | ODA 100 | ODA 100 | ODA 100 |
| Tertiary amine compound (% by mole/COOH with respect to polyimide precursor) |  | MMO 100 | MMO 100 | MMO 100 | MMO 100 |
| Terminal structure |  | Amine terminal | Amine terminal/sealing terminal 50/50 | Sealing terminal | Amine terminal |
| Ratio of solvents (weight ratio) |  | Water 100 | Water 100 | Water 100 | Water 100 |
| State of composition liquid |  | Dissolved | Dissolved | Dissolved | Dissolved |
| Number average molecular weight Mn |  | 30,000 | 19,000 | 19,000 | 1,000 |
| Imidization rate |  | 0.06 | 0.03 | 0.03 | 0.03 |
| Film forming properties | Void marks | B | B | B | B |
|  | Surface unevenness/pattern | B | B | B | B |
| Mechanical strength | Tensile strength (N/mm$^2$) | 185 | 145 | 125 | 120 |
|  | Tensile elongation (%) | 150 | 80 | 60 | 60 |

TABLE 7

| | | Example 25 | Example 26 | Example 27 | Example 28 |
|---|---|---|---|---|---|
| Polyimide precursor composition | | B-25 | B-26 | B-27 | B-28 |
| Tetracarboxylic dianhydride | PMDA | 40.61 g<br>186.20 mmol | 39.87 g<br>182.79 mmol | 39.87 g<br>182.79 mmol | 39.87 g<br>182.79 mmol |
| | BPDA | 13.70 g<br>46.55 mmol | 13.44 g<br>45.70 mmol | 13.44 g<br>45.70 mmol | 13.44 g<br>45.70 mmol |
| | BTDA | — | — | — | — |
| Diamine compound | PDA | — | — | — | — |
| | ODA | 45.69 g<br>228.18 mmol | 46.69 g<br>233.15 mmol | 46.69 g<br>233.15 mmol | 46.69 g<br>233.15 mmol |
| | BAPP | — | — | — | — |
| Terminal sealing agent | PA | — | — | — | — |
| Solvent | THF | — | — | — | — |
| | THFA | — | — | — | — |
| | Acetone | — | — | — | — |
| | MeOH | — | — | — | — |
| | IPA | — | — | — | — |
| | Water | 853.78 g | 872.27 g | 844.54 g | 830.67 g |
| Tertiary amine compound | MMO | 46.22 g<br>456.97 mmol | 27.73 g<br>274.18 mmol | 55.46 g<br>548.36 mmol | 69.33 g<br>685.45 mmol |
| | DMZ | — | — | — | — |
| Solid content (% by weight) | | 10 | 10 | 10 | 10 |
| Ratio between molar equivalents (tetracarboxylic dianhydride/diamine compound) | | 1.02 | 0.98 | 0.98 | 0.98 |
| Compositional ratio of tetracarboxylic acids (mol/mol) | | PMDA/BPDA<br>80/20 | PMDA/BPDA<br>80/20 | PMDA/BPDA<br>80/20 | PMDA/BPDA<br>80/20 |
| Diamine compound | | ODA<br>100 | ODA<br>100 | ODA<br>100 | ODA<br>100 |
| Tertiary amine compound (% by mole/COOH with respect to polyimide precursor) | | MMO<br>100 | MMO<br>60 | MMO<br>120 | MMO<br>150 |
| Terminal structure | | Acid anhydride terminal | Amine terminal | Amine terminal | Amine terminal |
| Ratio of solvents (weight ratio) | | Water<br>100 | Water<br>100 | Water<br>100 | Water<br>100 |
| State of composition liquid | | Dissolved | Dissolved | Dissolved | Dissolved |
| Number average molecular weight Mn | | 14,500 | 20,000 | 13,000 | 11,000 |
| Imidization rate | | 0.02 | 0.03 | 0.04 | 0.05 |
| Film forming properties | Void marks | A | A | A | A |
| | Surface unevenness/pattern | A | A | A | A |
| Mechanical strength | Tensile strength (N/mm$^2$) | 105 | 200 | 164 | 156 |
| | Tensile elongation (%) | 45 | 124 | 102 | 98 |

TABLE 8

| | | Example 29 |
|---|---|---|
| Polyimide precursor composition | | B-29 |
| Tetracarboxylic dianhydride | PMDA | 39.87 g<br>182.79 mmol |
| | BPDA | 13.44 g<br>45.70 mmol |
| | BTDA | — |
| Diamine compound | PDA | — |
| | ODA | 46.69 g<br>233.15 mmol |
| | BAPP | — |
| Terminal sealing agent | PA | — |
| Solvent | THF | — |
| | THFA | — |
| | Acetone | — |
| | MeOH | — |
| | IPA | — |
| | Water | 844.54 g |
| Tertiary amine compound | MMO | 55.46 g<br>548.36 mmol |
| | DMZ | — |
| Solid content (% by weight) | | 10 |
| Ratio between molar equivalents (tetracarboxylic dianhydride/diamine compound) | | 0.98 |
| Compositional ratio of tetracarboxylic acids (mol/mol) | | PMDA/BPDA<br>80/20 |
| Diamine compound | | ODA<br>100 |
| Tertiary amine compound (% by mole/COOH with respect to polyimide precursor) | | MMO<br>200 |
| Terminal structure | | Amine terminal |
| Ratio of solvents (weight ratio) | | Water<br>100 |
| State of composition liquid | | Dissolved |
| Number average molecular weight Mn | | 10,500 |
| Imidization rate | | 0.05 |
| Film forming properties | Void marks | A |
| | Surface unevenness/pattern | A |
| Mechanical strength | Tensile strength (N/mm$^2$) | 150 |
| | Tensile elongation (%) | 90 |

TABLE 9

|  |  | Comparative Example 1 | Comparative Example 2 | Comparative Example 3 | Comparative Example 4 |
|---|---|---|---|---|---|
| Polyimide precursor composition |  | Y-1 | Y-2 | Y-3 | Y-4 |
| Tetracarboxylic dianhydride | PMDA | 39.87 g<br>182.79 mmol | 39.87 g<br>182.79 mmol | 39.87 g<br>182.79 mmol | 39.87 g<br>182.79 mmol |
|  | BPDA | 13.44 g<br>45.70 mmol | 13.44 g<br>45.70 mmol | 13.44 g<br>45.70 mmol | 13.44 g<br>45.70 mmol |
|  | BTDA | — | — | — | — |
| Diamine compound | PDA | — | — | — | — |
|  | ODA | 46.69 g<br>233.15 mmol | 46.69 g<br>233.15 mmol | 46.69 g<br>233.15 mmol | 46.69 g<br>233.15 mmol |
|  | BAPP | — | — | — | — |
| Terminal sealing agent | PA | — | — | — | — |
| Solvent | THF | — | — | 853.78 g | — |
|  | THFA | — | — | — | 853.78 g |
|  | Acetone | — | — | — | — |
|  | MeOH | — | — | — | — |
|  | IPA | — | — | — | — |
|  | Water | — | — | — | — |
|  | NMP | 900 g | 853.78 g | — | — |
| Tertiary amine compound | MMO | — | 46.22 g<br>456.97 mmol | 46.22 g<br>456.97 mmol | 46.22 g<br>456.97 mmol |
|  | DMZ | — | — | — | — |
| Solid content (% by weight) |  | 10 | 10 | 10 | 10 |
| Ratio between molar equivalents (tetracarboxylic dianhydride/diamine compound) |  | 0.98 | 0.98 | 0.98 | 0.98 |
| Compositional ratio of tetracarboxylic acids (mol/mol) |  | PMDA/BPDA<br>80/20 | PMDA/BPDA<br>80/20 | PMDA/BPDA<br>80/20 | PMDA/BPDA<br>80/20 |
| Diamine compound |  | ODA<br>100 | ODA<br>100 | ODA<br>100 | ODA<br>100 |
| Tertiary amine compound (% by mole/COOH with respect to polyimide precursor) |  | — | MMO<br>100 | MMO<br>100 | MMO<br>100 |
| Terminal structure |  | Amine terminal | Amine terminal | Amine terminal | Amine terminal |
| Ratio of solvents (weight ratio) |  | NMP<br>100 | NMP<br>100 | THF<br>100 | Acetone<br>100 |
| State of composition liquid |  | Dissolved | Dissolved | Undissolved components existing | Undissolved components existing |
| Number average molecular weight Mn |  | 20,000 | 12,000 | — | — |
| Imidization rate |  | 0.03 | 0.03 | — | — |
| Film forming properties | Void marks | A | A | — | — |
|  | Surface unevenness/pattern | A | A | — | — |
| Mechanical strength | Tensile strength (N/mm²) | 90 | 90 | — | — |
|  | Tensile elongation (%) | 50 | 50 | — | — |

TABLE 10

|  |  | Comparative Example 5 | Comparative Example 6 |
|---|---|---|---|
| Polyimide precursor composition |  | Y-5 | Y-6 |
| Tetracarboxylic dianhydride | PMDA | 39.87 g<br>182.79 mmol | 51.63 g<br>236.72 mmol |
|  | BPDA | 13.44 g<br>45.70 mmol | — |
|  | BTDA | — | — |
| Diamine compound | PDA | — | — |
|  | ODA | 46.69 g<br>233.15 mmol | 43.37 g<br>241.55 mmol |
|  | BAPP | — | — |
| Terminal sealing agent | PA | — | — |
| Solvent | THF | — | — |
|  | THFA | — | — |
|  | Acetone | — | — |
|  | MeOH | — | — |
|  | IPA | — | — |
|  | Water | 900 g | 852.11 g |
|  | NMP | — | — |
| Tertiary amine compound | MMO | — | 47.89 g<br>473.44 mmol |
|  | DMZ | — | — |
| Solid content (% by weight) |  | 10 | 10 |
| Ratio between molar equivalents (tetracarboxylic dianhydride/diamine compound) |  | 0.98 | 0.98 |
| Compositional ratio of tetracarboxylic acids (mol/mol) |  | PMDA/BPDA<br>80/20 | PMDA<br>100 |
| Diamine compound |  | ODA<br>100 | ODA<br>100 |
| Tertiary amine compound (% by mole/COOH with respect to polyimide precursor) |  | — | MMO<br>100 |

TABLE 10-continued

| | | Comparative Example | |
|---|---|---|---|
| | | Comparative Example 5 | Comparative Example 6 |
| Terminal structure | | Amine terminal | Amine terminal |
| Ratio of solvents (weight ratio) | | Water 100 | Water 100 |
| State of composition liquid | | Undissolved components existing | Dissolved |
| Number average molecular weight Mn | | — | 400 |
| Imidization rate | | — | 0.03 |
| Film forming properties | Void marks | — | D |
| | Surface unevenness/pattern | — | D |
| Mechanical strength | Tensile strength (N/mm²) | — | 30 |
| | Tensile elongation (%) | — | 5 |

From the above results, it can be seen that good results are obtained in the evaluation of the film forming properties in the present Examples. In particular, it can be seen that in the present Examples, good results are obtained in the evaluation of the film forming properties and the mechanical strength, as compared with Comparative Examples 1 and 2 using NMP and Comparative Examples 9 using PMDA (pyromellitic dianhydride) alone.

Furthermore, the respective abbreviations in Tables 1 to 10 are as follows. Moreover, "-" in Tables 1 to 10 indicates that the item is not added or performed.

PMDA (pyromellitic dianhydride: molecular weight of 218.12)

BPDA (3,3',4,4'-biphenyltetracarboxylic dianhydride: molecular weight of 294.22)

BTDA (3,3',4,4'-benzophenone tetracarboxylic dianhydride: molecular weight of 322.23)

PDA (p-phenylenediamine: molecular weight of 108.14)

ODA (4,4'-diaminodiphenyl ether: molecular weight of 200.24)

BAPP (2,2-bis[4-(4-aminophenoxy)phenyl]propane: molecular weight of 410.51)

PA (phthalic anhydride: molecular weight of 148.12)

THF (tetrahydrofuran)

THFA (tetrahydrofurfuryl alcohol *)

MeOH (methanol)

IPA (isopropyl alcohol)

MMO (methylmorpholine: molecular weight: 101.15, dissociation constant pKb: 6.6 (value in literature))

DMZ (1,2-dimethylimidazole: molecular weight: 96.13, dissociation constant: pKb: 6.3 (experimental value))

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor composition, comprising:
a polyimide precursor including a condensation polymer of a tetracarboxylic dianhydride composed of a first tetracarboxylic dianhydride having a benzene ring to which two carboxylic anhydride groups are bonded and a second tetracarboxylic dianhydride other than the first tetracarboxylic dianhydride, and a diamine compound;
a tertiary amine compound; and
a water-soluble solvent consisting only of water,
wherein the polyimide precursor and the tertiary amine compound are dissolved in the water-soluble solvent, and
wherein the second tetracarboxylic dianhydride is 3,3',4,4'-biphenyltetracarboxylic dianhydride.

2. The polyimide precursor composition according to claim 1, wherein the first tetracarboxylic dianhydride is at least one selected from the group consisting of tetracarboxylic dianhydrides represented by the following formulae (TD11) and (TD 12):

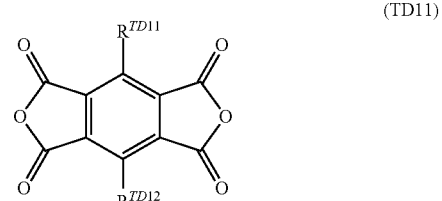

(TD11)

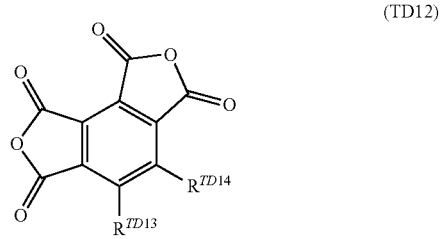

(TD12)

wherein $R^{TD11}$, $R^{TD12}$, $R^{TD13}$, and $R^{TD14}$ each independently represent a hydrogen atom, a carboxyl group, a substituted or unsubstituted alkyl group, or a substituted or unsubstituted phenyl group, wherein the alkyl group or phenyl group may be substituted with at least one selected from the group consisting of a hydroxyl group, a carboxyl group, and a cyano group.

3. The polyimide precursor composition according to claim 2, wherein the tetracarboxylic dianhydrides include the first tetracarboxylic dianhydride in an amount of 40% by mole to 95% by mole.

4. The polyimide precursor composition according to claim 1, wherein the tetracarboxylic dianhydrides include the first tetracarboxylic dianhydride in an amount of 40% by mole to 95% by mole.

5. The polyimide precursor composition according to claim 1, wherein in the polyimide precursor, a molar equivalent number of the diamine compound is higher than a molar equivalent number of the tetracarboxylic dianhydride.

6. The polyimide precursor composition according to claim 1, wherein the polyimide precursor includes at least one terminal amino group.

7. The polyimide precursor composition according to claim 1, wherein a number average molecular weight of the polyimide precursor is 2000 or more.

8. The polyimide precursor composition according to claim 1, wherein the tertiary amine compound is a cyclic tertiary amine compound containing a nitrogen atom in a ring.

9. The polyimide precursor composition according to claim 1, wherein a dissociation constant pKb of the tertiary amine compound is in a range of 5.0 to 7.0.

10. The polyimide precursor composition according to claim 1, wherein the tertiary amine compound is a tertiary amine compound not having any of a hydroxyl group, a primary amino group, and a secondary amino group.

11. The polyimide precursor composition according to claim 1, wherein the polyimide precursor is formed by adding the second tetracarboxylic anhydride and the diamine compound to the water-soluble solvent and then adding the first tetracarboxylic anhydride and the tertiary amine compound thereto.

12. A polyimide molded article molded by subjecting the polyimide precursor composition according to claim 1 to a heating treatment.

13. A method for preparing a polyimide molded article, comprising molding by subjecting the polyimide precursor composition according to claim 1 to a heating treatment.

14. A method for preparing a polyimide precursor composition, comprising:
  adding a second tetracarboxylic dianhydride other than a first tetracarboxylic dianhydride having a benzene ring to which two carboxylic anhydride groups are bonded, and a diamine compound to an aqueous solvent consisting only of water, and then adding the first tetracarboxylic dianhydride and a tertiary amine compound thereto, thereby forming a polyimide precursor,
  wherein the second tetracarboxylic dianhydride is 3,3',4,4'-biphenyltetracarboxylic dianhydride.

* * * * *